United States Patent
Noy

(10) Patent No.: US 6,628,623 B1
(45) Date of Patent: Sep. 30, 2003

(54) METHODS AND SYSTEMS FOR DETERMINING SWITCH CONNECTION TOPOLOGY ON ETHERNET LANS

(75) Inventor: Ariel Noy, Herzlia (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/317,692

(22) Filed: May 24, 1999

(51) Int. Cl.[7] .............................................. H04L 12/28
(52) U.S. Cl. ...................................... 370/255; 709/220
(58) Field of Search .............................. 370/254, 255, 370/256; 709/220

(56) References Cited

U.S. PATENT DOCUMENTS

| | | | | |
|---|---|---|---|---|
| 5,138,615 A | * | 8/1992 | Lamport et al. | 370/400 |
| 5,150,360 A | * | 9/1992 | Perlman et al. | 340/825.02 |
| 5,276,789 A | | 1/1994 | Besaw et al. | 395/140 |
| 5,394,402 A | * | 2/1995 | Ross | 370/402 |
| 5,606,669 A | * | 2/1997 | Bertin et al. | 370/256 |
| 5,914,956 A | | 6/1999 | Williams | 370/395 |
| 5,917,805 A | | 6/1999 | Manning et al. | 370/236 |
| 6,188,694 B1 | * | 2/2001 | Fine et al. | 370/402 |
| 6,192,051 B1 | * | 2/2001 | Lipman et al. | 370/389 |
| 6,262,977 B1 | * | 7/2001 | Seaman et al. | 370/254 |

OTHER PUBLICATIONS

M. Rose, "A Convention for Defining Traps for use with the SNMP", Request for Comments ("RFC") RCF–1215, Performance Systems International, Mar. 1991, pp. 1–9.

J. Case, M. Fedor, M. Schoffstall and J. Davin, Request for Comments ("RFC") RFC–1157, A Simple Network Management Protocol (SNMP), May 1990, pp. 27–28.

DPS Telecom, The Protocol Sep./Oct. 2000: SNMP Tutorial: An Introduction to SNMP, pp. 1–2.

* cited by examiner

Primary Examiner—Hassan Kizou
Assistant Examiner—Dmitry Levitan
(74) Attorney, Agent, or Firm—Howard Zaretsky, Esq.

(57) ABSTRACT

A method of determining an Ethernet LAN switch topology including the steps of a) establishing a communications link between a network management server and a switch in an Ethernet LAN, thereby defining the switch as a root switch, b) identifying each of a plurality of switches attached to the Ethernet LAN, the each of the plurality of switches includes at least one identifiable port, c) generating a mapping of each of the switches, the mapping including a list for each of the ports of the switches that each of the ports sees, d) eliminating from the mapping each upwardly looking one of the ports, e) identifying in the mapping at least one leaf connected to at least one of the ports, f) maintaining in a topological mapping at least one relationship between the leaves and the ports connected to the leaves, g) eliminating from the list for each of the ports each of the leaves that each of the ports sees, and h) repeating steps e)–g) until all of the leaves are identified.

11 Claims, 10 Drawing Sheets

Figure 1:
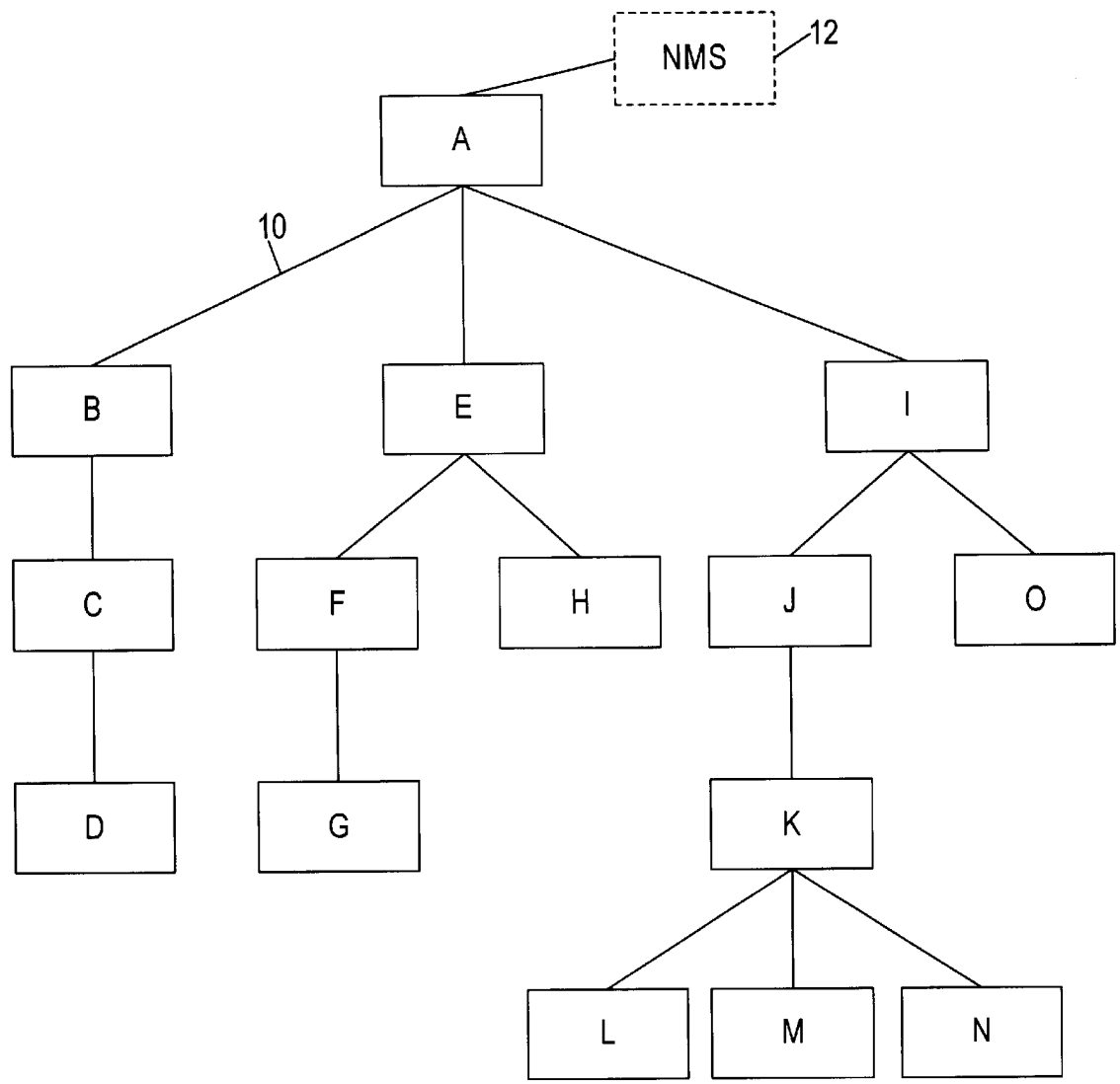

| SW | PORT | LINKS |
|---|---|---|
| A | 1 | B C D |
|   | 2 | E F G H |
|   | 3 | I J K L M N O |
|   | 4 | NMS |
| B | 1 | C D |
|   | 2 | A NMS |
| C | 1 | D |
|   | 2 | A B NMS |
| D | 1 | A B C NMS |
| E | 1 | F G |
|   | 2 | H |
|   | 3 | A NMS |
| F | 1 | G |
|   | 2 | A E NMS |
| G | 1 | A E F NMS |
| H | 1 | A E NMS |
| I | 1 | J K L M N |
|   | 2 | O |
|   | 3 | A NMS |
| J | 1 | K L M N |
|   | 2 | A I NMS |
| K | 1 | L |
|   | 2 | M |
|   | 3 | N |
|   | 4 | A I J NMS |
| L | 1 | A I J K NMS |
| M | 1 | A I J K NMS |
| N | 1 | A I J K NMS |
| O | 1 | A I NMS |

FIG 2

| SW | PORT | LINKS |
|----|------|-------|
| C | 1 | D |
| E | 2 | H |
| F | 1 | G |
| K | 1 | L |
| K | 2 | M |
| K | 3 | N |
| I | 2 | O |

FIG 5

| SW | PORT | LINKS |
|---|---|---|
| A | 1 | B C D |
|   | 2 | E F G H |
|   | 3 | I J K L M N O |
|   | ~~4~~ | ~~NMS~~ |
| B | 1 | C D |
|   | ~~2~~ | ~~A NMS~~ |
| C | 1 | D |
|   | ~~2~~ | ~~A B NMS~~ |
| D | ~~1~~ | ~~A B C NMS~~ |
| E | 1 | F G |
|   | 2 | H |
|   | ~~3~~ | ~~A NMS~~ |
| F | 1 | G |
|   | ~~2~~ | ~~A E NMS~~ |
| G | ~~1~~ | ~~A E F NMS~~ |
| H | ~~1~~ | ~~A E NMS~~ |
| I | 1 | J K L M N |
|   | 2 | O |
|   | ~~3~~ | ~~A NMS~~ |
| J | 1 | K L M N |
|   | ~~2~~ | ~~A I NMS~~ |
| K | 1 | L |
|   | 2 | M |
|   | 3 | N |
|   | ~~4~~ | ~~A I J NMS~~ |
| L | ~~1~~ | ~~A I J K NMS~~ |
| M | ~~1~~ | ~~A I J K NMS~~ |
| N | ~~1~~ | ~~A I J K NMS~~ |
| O | ~~1~~ | ~~A I NMS~~ |

16

⇒

| SW | PORT | LINKS |
|---|---|---|
| A | 1 | B ~~C D~~ |
|   | 2 | E F ~~G H~~ |
|   | 3 | I J K L M N O |
|   | ~~4~~ | ~~NMS~~ |
| B | 1 | ~~C D~~ |
|   | ~~2~~ | ~~A NMS~~ |
| C | 1 | ~~D~~ |
|   | ~~2~~ | ~~A B NMS~~ |
| D | ~~1~~ | ~~A B C NMS~~ |
| E | 1 | F ~~G~~ |
|   | 2 | ~~H~~ |
|   | ~~3~~ | ~~A NMS~~ |
| F | 1 | ~~G~~ |
|   | ~~2~~ | ~~A E NMS~~ |
| G | ~~1~~ | ~~A E F NMS~~ |
| H | ~~1~~ | ~~A E NMS~~ |
| I | 1 | J ~~K L M N~~ |
|   | 2 | ~~O~~ |
|   | ~~3~~ | ~~A NMS~~ |
| J | 1 | ~~K L M N~~ |
|   | ~~2~~ | ~~A I NMS~~ |
| K | 1 | ~~L~~ |
|   | 2 | ~~M~~ |
|   | 3 | ~~N~~ |
|   | ~~4~~ | ~~A I J NMS~~ |
| L | ~~1~~ | ~~A I J K NMS~~ |
| M | ~~1~~ | ~~A I J K NMS~~ |
| N | ~~1~~ | ~~A I J K NMS~~ |
| O | ~~1~~ | ~~A I NMS~~ |

20

FIG 6

| SW | FAKE MAC |
|---|---|
| A | 1 - 15 |
| B | 2,3,4 |
| C | 3,4 |
| D | 4 |
| E | 5,6,7,8 |
| F | 6,7 |
| G | 7 |
| H | 8 |
| I | 9,10,11,12,13,14,15 |
| J | 10,11,12,13,14 |
| K | 11,12,13,14 |
| L | 12 |
| M | 13 |
| N | 14 |
| O | 15 |

FIG 8

| SW | FAKE MAC |
|---|---|
| A | 1 - 15 |
| B | 2,3,4 |
| C | 3,4 |
| D | 4 |
| E | 5,6,7,8 |
| F | 6,7 |
| G | 7 |
| H | 8 |
| I | 9,10,11,12,13,14,15 |
| J | 10,11,12,13,14 |
| K | 11,12,13,14 |
| L | 12 |
| M | 13 |
| N | 14 |
| O | 15 |

22

26

| SW | FAKE MAC |
|---|---|
| A | 1 - 3,5,6,9 - 15 |
| B | 2,3,~~4~~ |
| C | 3,~~4~~ |
| D | ~~4~~ |
| E | 5,6,~~7,8~~ |
| F | 6,~~7~~ |
| G | ~~7~~ |
| H | ~~8~~ |
| I | 9,10,11,~~12,13,14,15~~ |
| J | 10,11,~~12,13,14~~ |
| K | 11,~~12,13,14~~ |
| L | ~~12~~ |
| M | ~~13~~ |
| N | ~~14~~ |
| O | ~~15~~ |

FIG 9

METHODS AND SYSTEMS FOR DETERMINING SWITCH CONNECTION TOPOLOGY ON ETHERNET LANS

Topology discovery relates generally to obtaining information on devices (e.g., switches, repeaters, bridges, etc.) in a network and reporting the information in some form such as by display of a graphical representation of the network on a display device.

Certain prior art topology discovery methods utilize a process of flooding of topology information within the network. In such systems, each device transmits link state information to each of its neighbors and each of its neighbors, in turn, transmit the message to each of its own neighbors. In this manner, the entire network topology can eventually be computed at each device in the network. It will be readily seen that in such systems the use of a flooding technique can lead to infinite loops in the absence of some control. Further, even with such control, a large number of messages are generated, placing an undesirable load on the network. In addition, certain prior art topology discovery methods require some intervention, knowledge or processing power on the part of the "neighbor" switches when topology information is advertised, resulting in adverse performance implications.

Additionally, in accordance with a preferred embodiment of the present invention, the identifying step b) includes each of the plurality of switches attached to the Ethernet LAN, each of the switches now referred to as a reporting switch, sending to the network management server an address of the reporting switch, an address for each of the ports in the reporting switch, and the list of the switches which each of the ports in the reporting switch sees.

There is also provided in accordance with a preferred embodiment of the present invention a method of determining an Ethernet LAN switch topology, the method including the steps of a) establishing a communications link between a network management server and a switch in an Ethernet LAN, thereby defining the switch as a root switch, b) identifying each of a plurality of switches attached to the Ethernet LAN, the each of the plurality of switches is identifiable by a MAC address, c) sending a packet to each of the plurality of switches, the each packet includes a unique fake MAC address, d) generating a mapping of each of the switches, the mapping including a list for each of the switches the fake MAC addresses that each of the switches sees, e) identifying in the mapping at least one leaf, a leaf being any of the switches that sees only one fake MAC address, f) maintaining in a topological mapping the at least one leaf, g) eliminating from the list each of the fake MAC address seen by the leaf, h) repeating steps e)–g) until all of the leaves are identified, and i) maintaining in the topological mapping at least one relationship between at least two leaves identified in at least two consecutive iterations of steps e)–g), the leaf identified in a first one of the iterations had been seen by the leaf identified in a subsequent one of the iterations.

Figure 3:
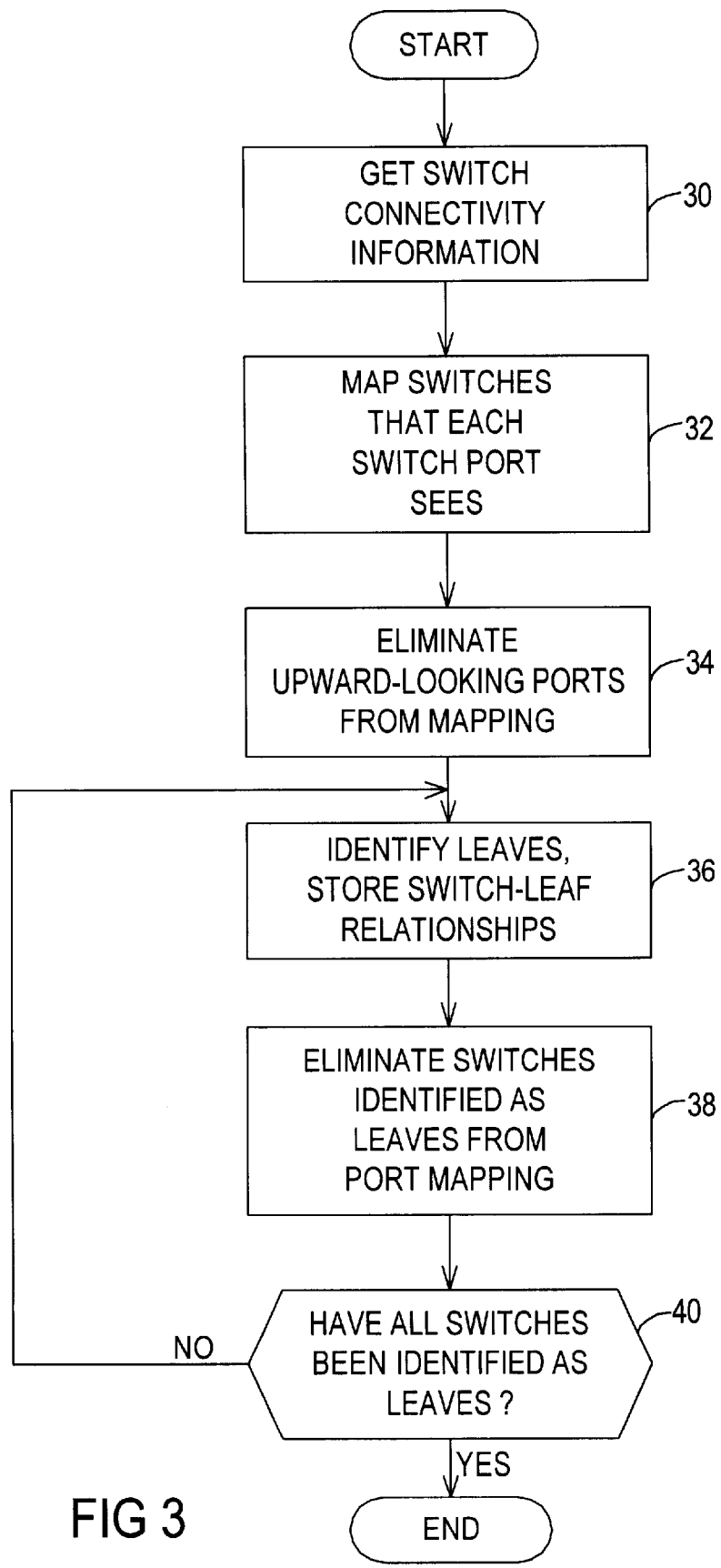
Figure 4:
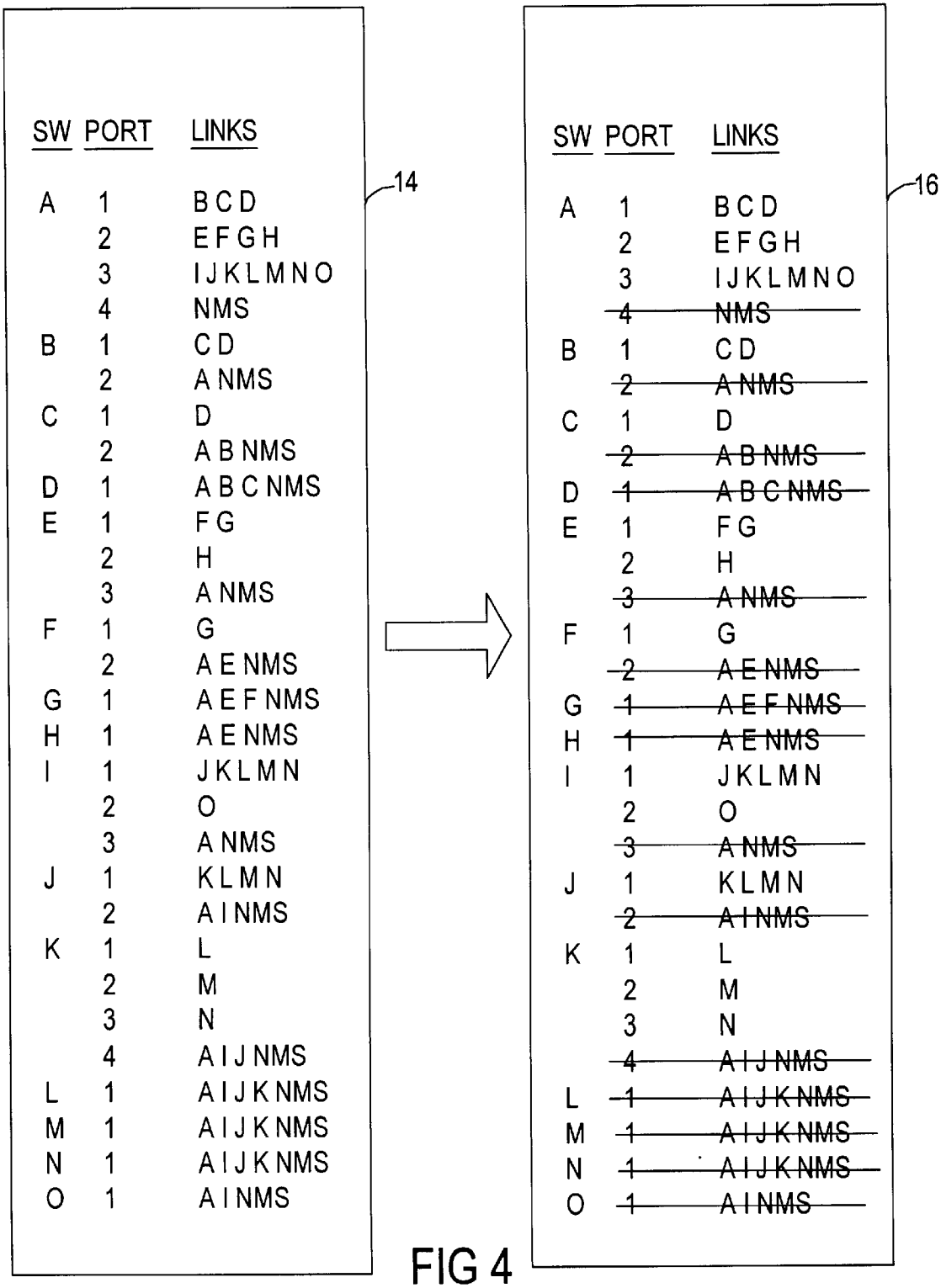

Reference is now made to FIG. 3 which is a simplified flowchart illustration of a method for determining switch connection topology on an Ethernet LAN, the method being operative in accordance with preferred embodiment of the present invention. In the method of FIG. 3, NMS 12 (FIG. 1) requests and/or otherwise receives switch connectivity information from the switches A–O (step 30). The information is preferably derived from each switch's forwarding table and includes the switch's MAC address, the address of each of the switch's ports, and the MAC addresses of each switch that is "seen" by each port as defined hereinabove. The information may be acquired by NMS 12 by setting a simple network management protocol (SNMP) trap at each switch, where each switch provides this information to NMS 12 when a new MAC address becomes known to it. Alternatively, NMS 12 may send an SNMP request for the information to each switch. Next, each port in mapping 14 which "sees" NMS 12 or the MAC address of a router serving NMS 12, referred to herein as an "upward looking" port is identified (step 32) and eliminated from mapping 14 along with the list of switches that the port sees step 34). This is more particularly shown with additional reference to FIG. 4 which shows mapping 14 being so revised, resulting in a revised mapping 16 in which the upward looking ports of mapping 14 have been eliminated.

Figure 5:
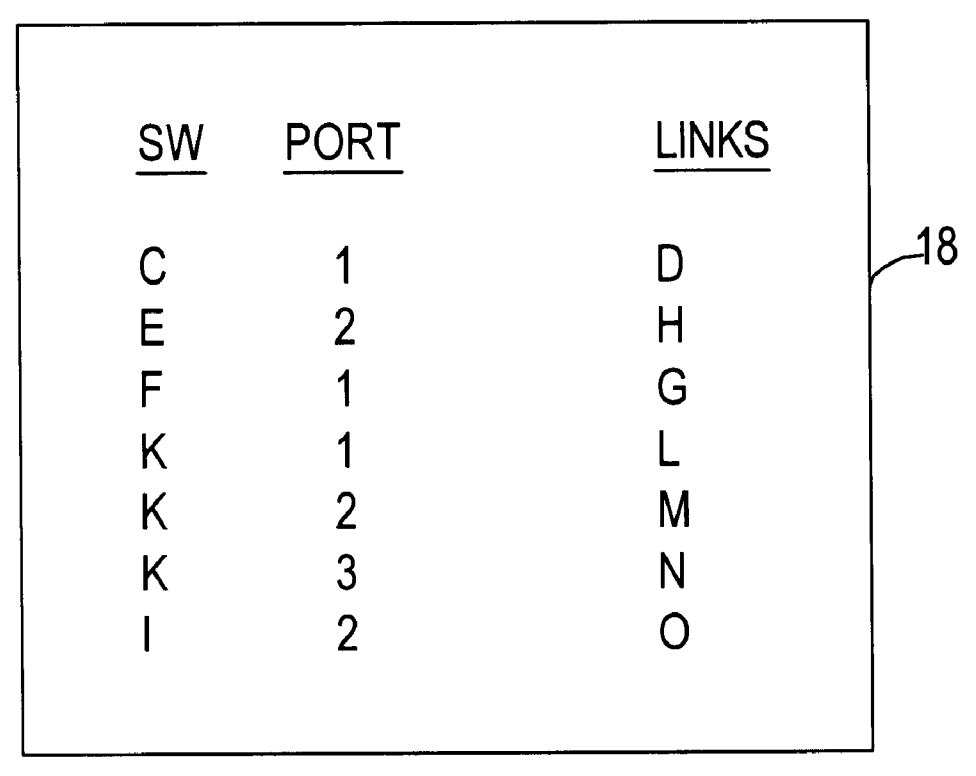

Once the upward looking ports have been eliminated, each port in mapping 16 which sees only a single switch is identified (step 36). Such a switch is referred to herein as a "leaf". The relationship between a switch and a leaf is maintained in a topological mapping 18, shown with additional reference to FIG. 5. In the example shown in FIG. 4, leaves are present for switch C at port 1 (switch D), switch E at port 2 (switch H), switch F at port 1 (switch G), switch K at port 1 (switch L), port 2 (switch M), port 3 (switch N) and switch I at port 2 (switch O). Switches that have been identified as leaves are then eliminated from the list of switches that each port sees (step 38). This is more particularly shown with additional reference to FIG. 6 which shows mapping 16 being so revised, resulting in a revised mapping 20 in which the leaves D, G, H, L, M, N and O of mapping 16 have been eliminated. Mapping 20 is then examined for leaves in the same manner as described above for mapping 16, with the switch-leaf relationships being maintained in topological mapping 18 (FIG. 5), and a revised mapping being produced in which the leaves have been eliminated from the ports that see them. Processing continues in this manner until no more leaves are found (step 40). A graphical topological map may then be constructed from topological mapping 18 to depict the physical topology of the Ethernet LAN using conventional techniques.

Figure 7:
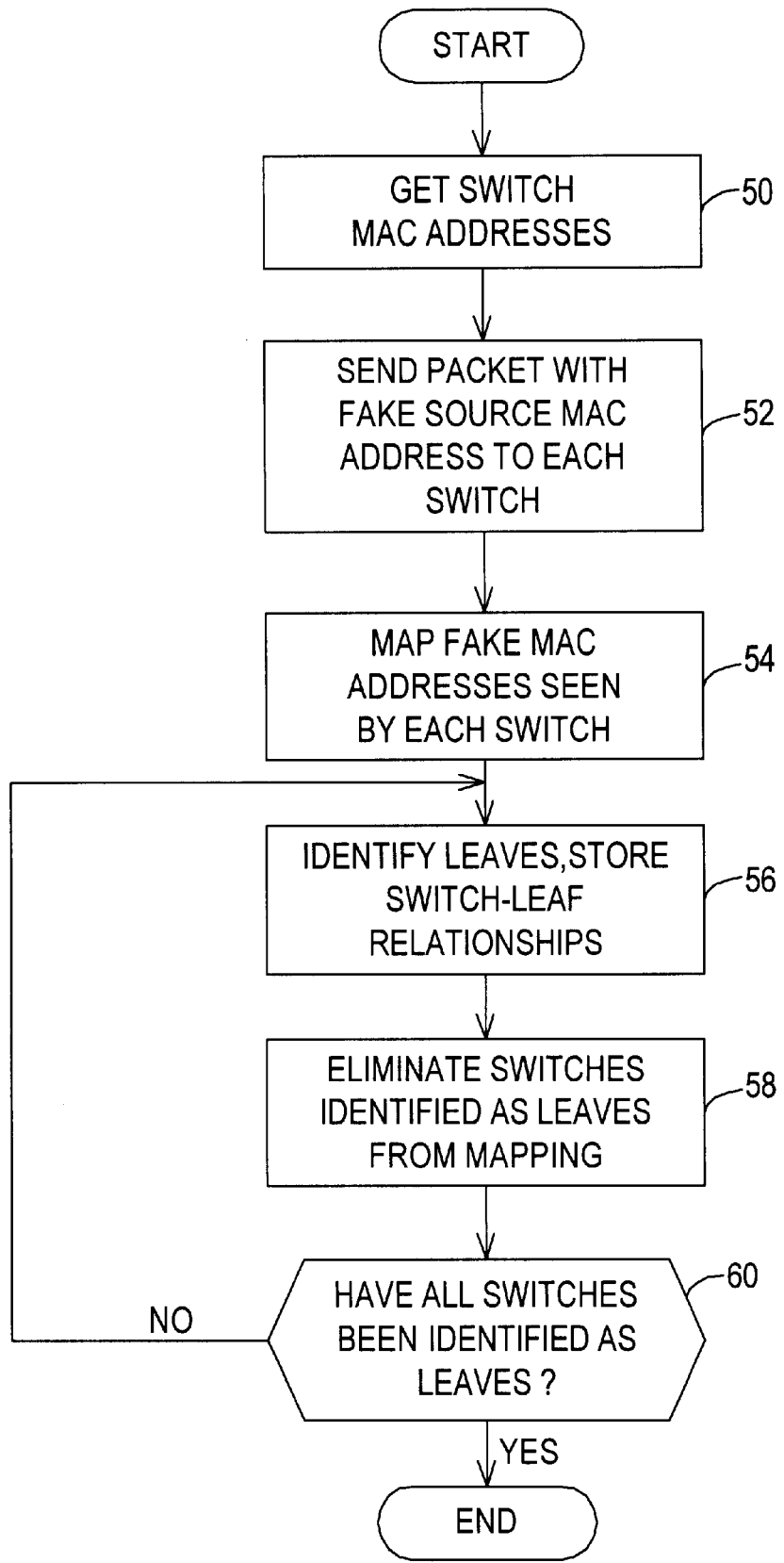

Reference is now made to FIG. 7 which is a simplified flowchart illustration of a method for determining switch connection topology on an Ethernet LAN, the method being operative in accordance with another preferred embodiment of the present invention. In the method of FIG. 7 NMS 12 (FIG. 1) pings each device in the network in order to determine the MAC address of each switch (step 50). The ping also causes each switch to build its forwarding table such that when subsequent packets are sent to a specific switch they will be efficiently routed to the destination switch without passing through switches that are not on the path to the destination switch. NMS 12 then sends a unique packet to each switch in which the source MAC address in each packet has been populated with a "fake" MAC address not know to exist for any of the devices in the LAN (step 52). A different fake MAC address is sent to each switch, with no two switch destinations receiving a packet with the same source MAC address. For illustration purposes, fake MAC address 1 is sent to switch A, 2 to switch B, and so forth. Next, NMS 12 requests and/or otherwise receives from each switch a list of the MAC addresses known to the switch. Only the fake MAC addresses seen by each switch are maintained in a mapping 22, shown with additional reference to FIG. 8.

Figure 10:
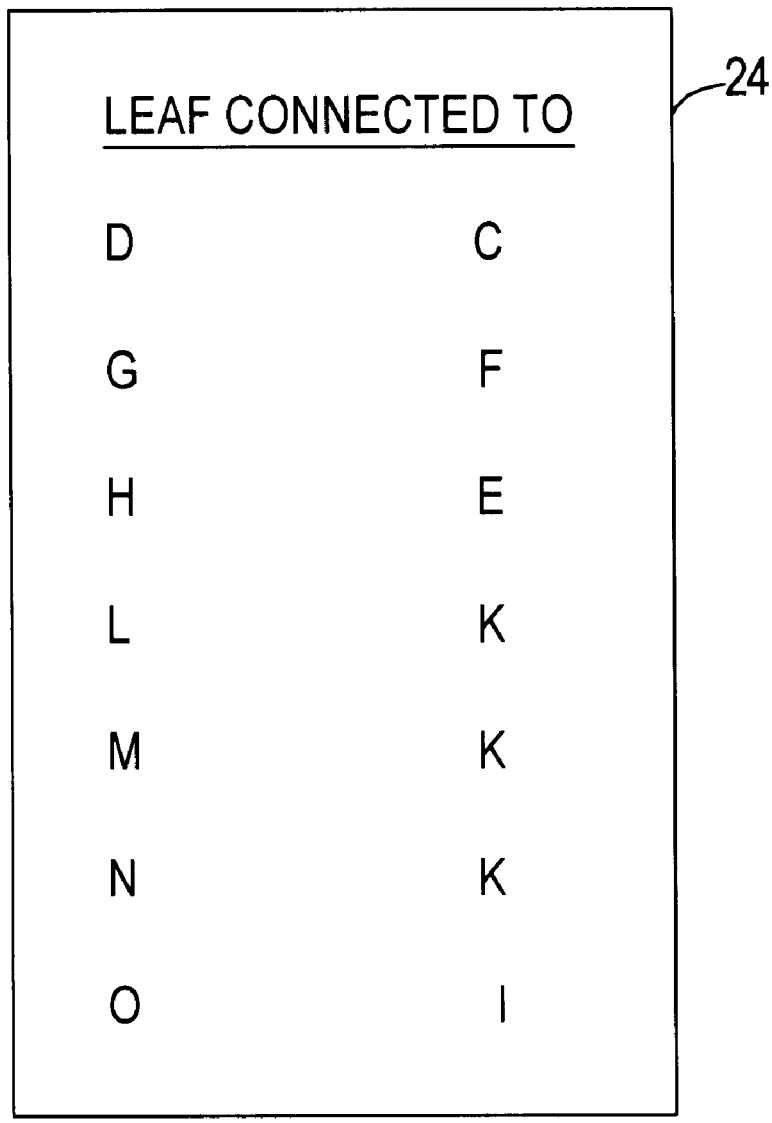

Once the fake MAC addresses seen by each switch are identified, each switch in mapping 22 which sees only a single fake MAC address is identified (step 56). Such a switch is referred to herein as a "leaf". The relationship between a switch and a leaf is maintained in a topological mapping 24, shown with additional reference to FIG. 10. In the example shown in FIG. 8, switches D (fake address 4), G (fake address 7), H (fake address 8), L (fake address 12), M (fake address 13), N (fake address 14) and O (fake address 15) are identified as leaves. The fake MAC addresses for switches that have been identified as leaves are then eliminated from the list of fake MAC addresses that each switch sees (step 58). This is more particularly shown with additional reference to FIG. 9 which shows mapping 22 being so revised, resulting in a revised mapping 26 in which the leaves D, G, H, L, M, N and O of mapping 22 have been eliminated. Mapping 26 is then examined for leaves in the same manner as described above for mapping 22. Each leaf X identified in mapping 26 may be connected to one or more leaves identified in mapping 22 whose fake MAC addresses had previously been seen by leaf X, with the switch-leaf relationships being maintained in topological mapping 24 (FIG. 10). As before, a revised mapping is produced in which the leaves have been eliminated, and processing continues in this manner until no more leaves are found (step 60). A graphical topological map may then be constructed from topological mapping 24 to depict the physical topology of the Ethernet LAN using conventional techniques.

What is claimed is:

1. A method of determining an Ethernet Local Area Network (LAN) switch topology, the method comprising the steps of:

establishing a communications link between a network management server and a switch in an Ethernet LAN, thereby defining said switch as a root switch;

first identifying each of a plurality of switches attached to said Ethernet LAN, wherein each of said plurality of switches includes at least one identifiable port;

generating a mapping of each of said switches, the mapping comprising a list for each of said ports of said switches that each of said ports sees;

first eliminating from said mapping each upwardly looking one of said ports;

second identifying in said mapping at least one leaf connected to at least one of said ports;

maintaining in a topological mapping at least one relationship between said leaves and said ports connected to said leaves;

second eliminating from said list for each of said ports each of said leaves that each of said ports sees; and repeating said steps of second identifying, maintaining and second eliminating until all of said leaves are identified.

2. The method according to claim 1, wherein said root switch is connected directly to said network management server.

3. The method according to claim 1, wherein said root switch is connected to said network management server via at least one router.

4. The method according to claim 1, wherein said step of first identifying comprises each of said plurality of switches attached to said Ethernet LAN, each of said switches now referred to as a reporting switch, sending to said network management server an address of said reporting switch, an address for each of said ports in said reporting switch, and said list of said switches which each of said ports in said reporting switch sees.

5. The method according to claim 4, wherein said address of said reporting switch is a Media Access Control (MAC) address.

6. The method according to claim 4, wherein said reporting switch reports in response to a Simple Network Management Protocol (SNMP) trap.

7. The method according to claim 4, wherein said reporting switch reports in response to a request sent by said network management server.

8. The method according to claim 1, further comprising the step of utilizing said topological mapping to generate a graphical topological map depicting the physical topology of the Ethernet LAN.

9. A method of determining an Ethernet Local Area Network (LAN) switch topology, the method comprising the steps of:

establishing a communications link between a network management server and a switch in an Ethernet LAN, thereby defining said switch as a root switch;

first identifying each of a plurality of switches attached to said Ethernet LAN, wherein each of said plurality of switches is identifiable by a Media Access Control (MAC) address;

sending a packet to each of said plurality of switches, wherein each packet comprises a unique fake MAC address;

generating a mapping of each of said switches, the mapping comprising a list for each of said switches the fake MAC addresses that each of said switches sees;

second identifying in said mapping at least one leaf, being any of said switches that sees only one fake MAC address;

first maintaining in a topological mapping said at least one leaf, eliminating from said list each of said fake MAC address seen by said leaf;

repeating said steps of second identifying, first maintaining and eliminating until all of said leaves are identified; and second maintaining in said topological mapping at least one relationship between at least two leaves identified in at least two consecutive iterations of said steps of second identifying, first maintaining and eliminating, wherein said leaf identified in a first one of said iterations had been seen by said leaf identified in a subsequent one of said iterations.

10. The method according to claim 9, wherein said step of first identifying comprises pinging each device in said Ethernet LAN to determine the MAC address of each switch therein.

11. The method according to claim 9, further comprising the step of generating a general topology map depicting the physical topology of the Ethernet LAN utilizing said topological mapping.

\* \* \* \* \*